US006598299B2

United States Patent
Stark et al.

(10) Patent No.: US 6,598,299 B2
(45) Date of Patent: Jul. 29, 2003

(54) ECCENTRIC DRIVE FOR A PORTABLE HANDHELD WORK APPARATUS

(75) Inventors: Thomas Stark, Waiblingen (DE); Florian V. Krane, Remshalden (DE)

(73) Assignee: Andreas Stihl & Co., Waiblingen (DE)

( * ) Notice: Subject to any disclaimer, the term of this patent is extended or adjusted under 35 U.S.C. 154(b) by 35 days.

(21) Appl. No.: 09/985,712

(22) Filed: Nov. 6, 2001

(65) Prior Publication Data

US 2002/0053140 A1 May 9, 2002

(30) Foreign Application Priority Data

Nov. 8, 2000 (DE) .......................... 100 56 366

(51) Int. Cl.[7] .............................. B26B 19/28; A01G 3/53
(52) U.S. Cl. .............................. 30/220; 30/216; 30/218; 74/55
(58) Field of Search .......................... 30/216, 217, 218, 30/219, 220; 74/45, 53, 54, 55

(56) References Cited

U.S. PATENT DOCUMENTS

| 3,699,655 A | * | 10/1972 | Taylor et al. .................. 30/216 |
| 3,897,630 A | * | 8/1975 | Glover et al. .................. 30/220 |
| 5,531,027 A | * | 7/1996 | Martinez et al. .............. 30/216 |
| 5,771,583 A | * | 6/1998 | Kremsler et al. ............. 30/216 |
| 6,170,159 B1 | * | 1/2001 | Kramer et al. ................ 30/216 |

* cited by examiner

Primary Examiner—Hwei-Siu Payer
(74) Attorney, Agent, or Firm—Walter Ottesen

(57) ABSTRACT

The invention relates to an eccentric drive (1) and especially to an eccentric drive for a portable handheld work apparatus having a wheel (3) driven by a drive motor (2). A cam (5) is eccentrically fixed to an end face (4) of the wheel (3). The cam (5) is held by a connecting rod (6) and cylinder-shaped roller bodies (7) are mounted between the connecting rod (6) and the cam (5). The roller bodies (7) have axial ends (8) which engage in an annular slot (9) of the wheel (3). A holding element (11) is disposed on the cam (5) and limits the axial play of the roller bodies (7).

12 Claims, 3 Drawing Sheets

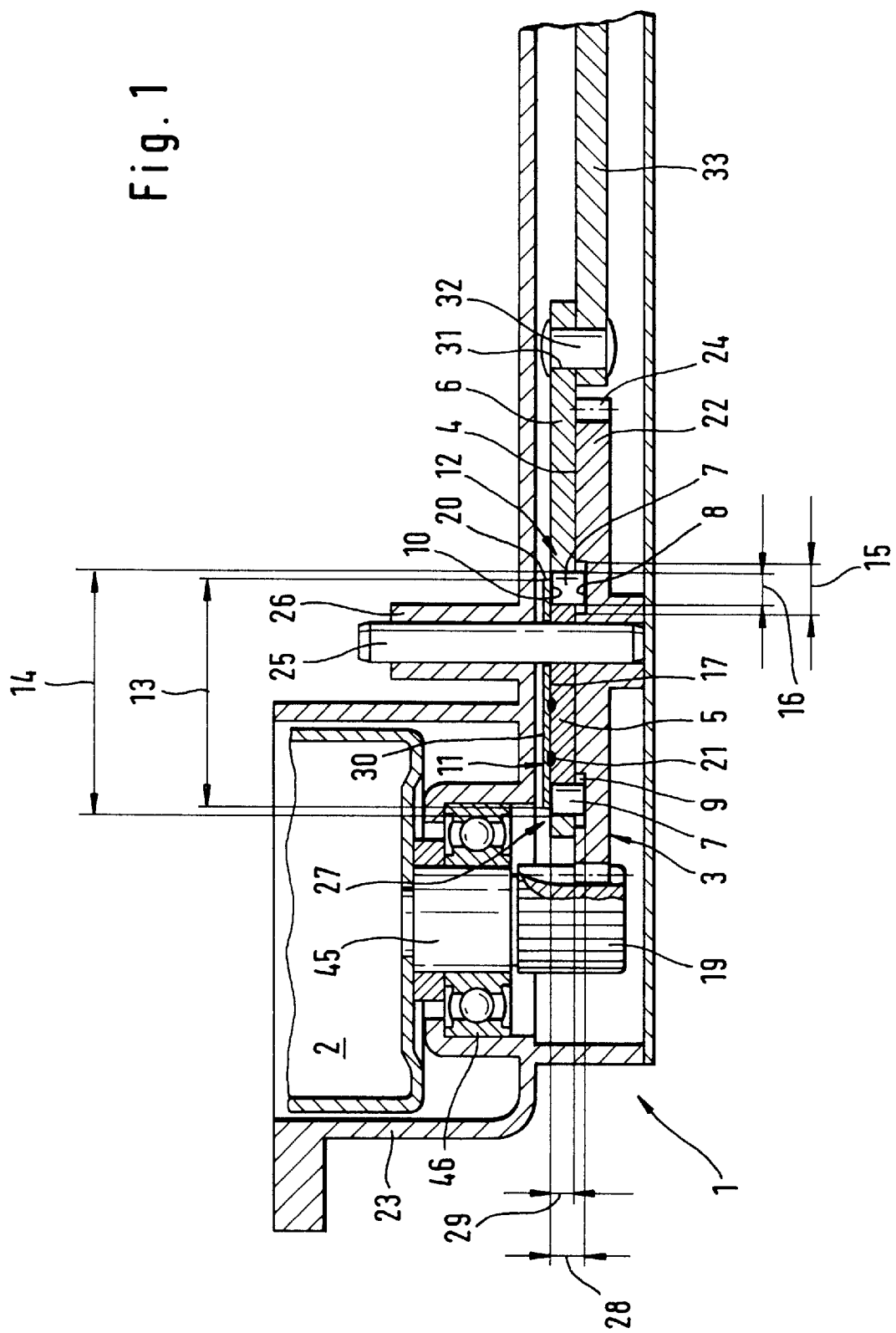

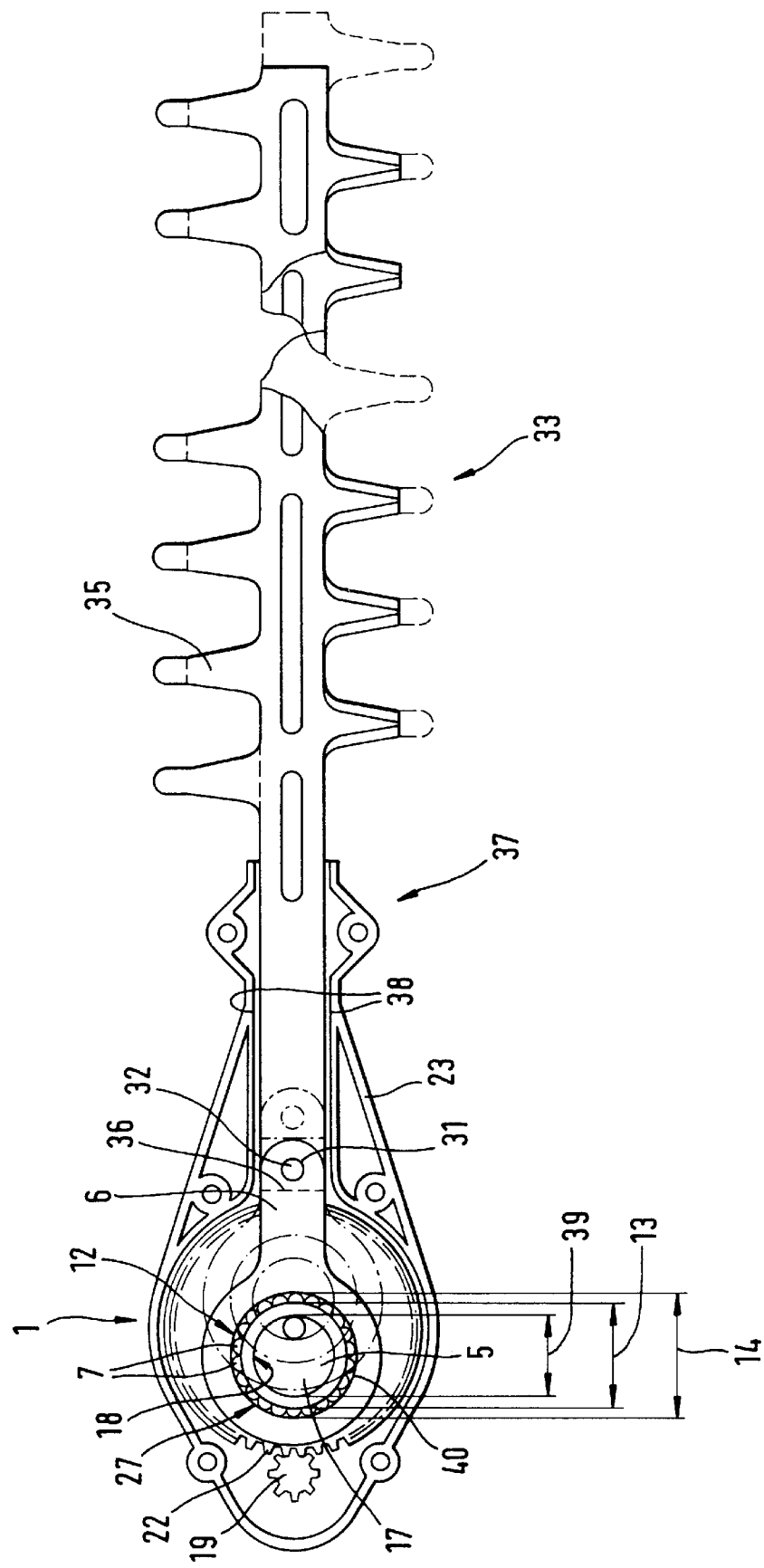

ECCENTRIC DRIVE FOR A PORTABLE HANDHELD WORK APPARATUS

BACKGROUND OF THE INVENTION

Eccentric drives for portable handheld work apparatus are known wherein a wheel, especially a toothed wheel, is driven by a drive motor. An eccentric cam is fixed on an end face of the wheel and the cam is connected to a drive rod. Roller bodies are arranged radially between the cam and the eye of the connecting rod. The roller bodies are held axially by the circular disc-shaped edges of the connecting rod eye. The roller bodies can drop out of the eye of the connecting rod toward the center during assembly or during maintenance work as long as the connecting rod is not seated on the cam. Especially the assembly of the connecting rod is made more difficult thereby.

SUMMARY OF THE INVENTION

It is an object of the invention to provide an eccentric drive which is easy to assembly and to disassemble.

The eccentric drive of the invention includes an eccentric drive for a handheld portable work apparatus. The eccentric drive of the invention includes: a wheel defining a rotational axis and having an end face; a cam fixedly mounted eccentrically on the end face so as not to be rotatable relative to the wheel; a drive motor for driving the wheel to rotate about the rotational axis; a connecting rod having a connecting rod eye for receiving the cam therein so as to cause the connecting rod eye and the cam to conjointly define an interface therebetween; a plurality of roller bodies disposed at the interface to define a roller bearing between the cam and the connecting rod eye; the wheel having an annular slot disposed in surrounding relationship to the cam; each of the roller bodies having a first axial end engaging the annular slot; a holder having an edge and being fixed on the cam; each of the roller bodies having a second axial end adjacent the holder; and, the roller bodies projecting radially beyond the edge of the holder.

An advantage of the invention is that an eccentric drive, especially for a portable handheld work apparatus, is provided which can be assembled and disassembled rapidly and without difficulty and without additional complexity with respect to components. According to the invention, an annular slot surrounding the cam is provided in which the roller bodies engage with their axial ends and, with their other axial ends, lie against a holding element fixed on the cam. In this way, the roller bodies cannot drop out of their position when the connecting rod is assembled onto the cam and disassembled therefrom. The roller bodies project in the radial direction beyond the edge of the holding element. In this way, a roller bearing is formed on the cam over which the connecting rod can be axially passed with the connecting rod eye without the roller bodies moving out of their position. The roller bodies are inseparably held on the wheel around the cam. The depth of the annular slot is greater than the spacing between the holding element and the adjacent axial ends of the roller bodies.

In a preferred embodiment, the width of the annular slot (in which the roller bodies axially engage) is greater than the diameter of the roller bodies so that the roller bodies are inseparably held in the slot with radial play. The holding element is preferably formed to have a circular shape and is fixed to the end face of the cam. The holding element is preferably formed as a ring or disc. The outer diameter of the ring is less than the outer diameter of the roller bearing. The holding element is preferably made of spring steel and is fixed to the end face of the cam with a spot-weld connection. It can be practical to bring the connecting rod in sliding contact engagement with the end face of the wheel in order to hold the structural elevation of the eccentric drive low. The end face of the wheel defines a lateral stop for the connecting rod. Preferably, the wheel is configured as a toothed wheel and the cam is configured as one piece with the toothed wheel. The toothed wheel is in meshing engagement with a pinion driven by the drive motor.

BRIEF DESCRIPTION OF THE DRAWINGS

The invention will now be described with reference to the drawings wherein:

FIG. 1 is a side elevation view, in section, of an eccentric drive according to the invention;

DESCRIPTION OF THE PREFERRED EMBODIMENTS OF THE INVENTION

Figure 1A:
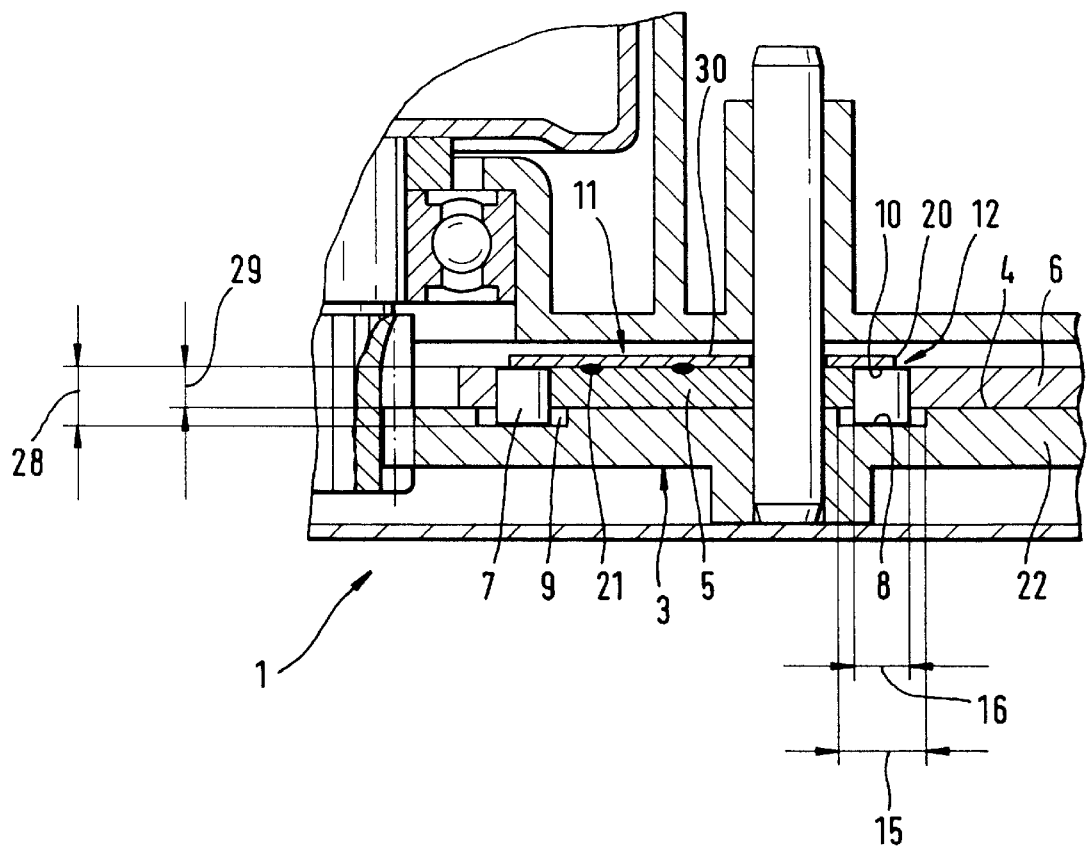
FIG. 1a is an enlarged detail view of a portion of the eccentric drive of FIG. 1; and, FIG. 2 is a plan view of a hedge trimmer showing the eccentric drive and the cutting blade coupled thereto.

FIG. 1 is a longitudinal section view through an eccentric drive 1 of a portable handheld work apparatus. A drive motor 2 is held in a housing 23. The drive motor 2 is provided with a drive shaft 45 which is accommodated in a ball bearing 46. The ball bearing 46 is braced on the housing 23. A pinion 19 is fixedly attached to the drive shaft 45 so as to be tight with respect to torque. The pinion 19 is in meshing engagement with the toothed rim 24 of a gear wheel 22. A cam 5 is fixed on the end face 4 of the toothed wheel 22 facing toward the drive motor 2. The cam 5 is mounted eccentrically to a shaft 25 on which the toothed wheel 22 is rotatably held. Preferably, the cam 5 is threadably engaged or soldered to the toothed wheel 22. The shaft 25 is accommodated in a shaft bearing 26 formed on the housing 23.

A connecting rod 6 has a large connecting rod eye 27 with which the connecting rod radially encloses the cam 5. Roller bodies 7 are arranged between the cam 5 and the connecting rod 6. The roller bodies 7 function to form a roller bearing 12 between the large connecting rod eye 27 of the connecting rod 6 and the cam 5 (see FIG. 2). As shown in the detail view of FIG. 1a, the roller bodies 7 have a greater height 28 than the height 29 of the cam 5. The roller bodies 7 engage with axial ends 8 into an annular slot 9 in the end face 4 of the toothed wheel 22. The roller bodies 7 lie with their other axial end 10 against a holding element 11 with play. The depth of the annular slot 9 is greater than the distance between the holding element 11 and an adjacent axial end 10 of the roller bodies 7. The annular slot 9 causes the roller bodies 7 to be radially held to the cam 5. The width 15 of the annular slot 9 is greater than the diameter 16 of the roller bodies 7 so that the roller bodies 7 are guided with play in the annular slot 9.

In the embodiment shown, the holding element 11 is configured as a circular ring-shaped disc 30. The disc 30 is fixed to the end face 17 of the cam 5 facing away from the toothed wheel 22. The roller bodies 7 project radially beyond the edge 20 of the disc 30. The outer diameter 14 of the roller bearing 12 is therefore greater than the outer diameter 13 of the holding element 11, that is, of the disc 30. In this way, the connecting rod, especially the large eye 27 of the connecting rod, can be axially guided over the cam 5 and the roller bearing 12 having the roller bodies 7 without the roller bodies 7 in anyway coming out of their position.

It is practical to configure the disc 30 of spring steel and to fix the same on the cam 5 with a spot weld connection 21.

In order to minimize the structural height of the eccentric drive, it is practical to place the connecting rod 6 into sliding contact engagement with the end face 4 of the toothed wheel 22. The toothed wheel 22 thereby functions as an axial guide for the connecting rod 6. A bolt 32 passes through the connecting rod 6 at its small connecting rod eye 31. A tool 33 is connected to the bolt 32. Here, the work tool 33 is a hedge trimmer cutting blade. It can be practical to configure the cam 5 and the toothed wheel 22 as one piece.

FIG. 2 shows a plan view of an eccentric drive 1 and the cutting blade 35 of the hedge trimmer coupled thereto. The cutting blade 35 is held so as to be longitudinally displaceable in the housing 23 of the hedge trimmer. The eccentric drive 1 is formed essentially by the pinion 19 and the toothed wheel 22 with the cam 5. The toothed wheel 22 is driven by the pinion 19. The cam 5 is surroundingly engaged by the large connecting rod eye 27 of the connecting rod 6. The eccentric drive 1 is arranged in the housing 23 having a lozenge-shaped outline. The housing 23 has an open lozenge-shaped front end through which the cutting blade 35 projects. The cutting blade 35 is slidably guided in the interior of the housing 23 by parallel guides, especially by a slide guide 38 extending into the housing 23.

The small connecting rod eye 31 of the connecting rod 6 is fixed with the bolt 32 at the end 36 of the cutting blade 35. The end 36 is arranged in the interior of the housing 23. The cylinder-shaped roller bodies 7 are mounted radially between the large connecting rod eye 27 and the cam 5 and define the roller bearing 12 for low-friction journaling the connecting rod 6 on the toothed wheel 22. A ring 18 is fixed on the end face 17 of the cam 5 facing away from the toothed wheel 22. The outer diameter 13 of the ring 18 is greater than the diameter 39 of the cam 5. The outer diameter 13 of the ring 18 is, however, less than the outer diameter 14 of the roller bearing 12. The roller bodies 7 of the roller bearing 12 are therefore only partially covered axially by the ring 18. This constructive measure effects a radial and axial holding of the roller bodies 7 against the cam 5 while simultaneously making it possible to apply lubricating grease to the roller bodies 7 via the gap between the outer diameter 13 of the ring 18 and the inner wall 40 of the large connecting rod eye 27. A permanent lubrication of the roller bearing is effected in this way. In lieu of the toothed wheel 22 of the eccentric drive, the wheel 3 can, for example, also be formed by a belt-driven wheel, chain-driven wheel or as a disc having a friction connection to the drive motor 2.

Other portable handheld work apparatus having oscillating work tools can be driven with the eccentric drive of the invention such as a pruning saw or a shaking apparatus for the harvest of fruit from trees or bushes.

It is understood that the foregoing description is that of the preferred embodiments of the invention and that various changes and modifications may be made thereto without departing from the spirit and scope of the invention as defined in the appended claims.

What is claimed is:

1. An eccentric drive for a work apparatus, the eccentric drive comprising:

a wheel defining a rotational axis and having an end face;

a cam fixedly mounted eccentrically on said end face so as not to be rotatable relative to said wheel;

a drive motor for driving said wheel to rotate about said rotational axis;

a connecting rod having a connecting rod eye for receiving said cam therein so as to cause said connecting rod eye and said cam to conjointly define an interface therebetween;

a plurality of roller bodies disposed at said interface to define a roller bearing between said cam and said connecting rod eye;

said wheel having an annular slot disposed in surrounding relationship to said cam;

each of said roller bodies having a first axial end engaging said annular slot;

a holder having an edge and being fixed on said cam;

each of said roller bodies having a second axial end adjacent said holder; and, said roller bodies projecting radially beyond said edge of said holder.

2. The eccentric drive of claim 1, said annular slot having a depth; the second axial end of each of said roller bodies and said holder conjointly defining a space therebetween; and, said depth being greater than said space.

3. The eccentric drive of claim 2, said slot having a width and each of said roller bodies having a diameter; and, said width being greater than said diameter.

4. The eccentric drive of claim 3, wherein said cam has an end face and said holder is fixed to said end face of said cam.

5. The eccentric drive of claim 4, wherein said holder is spot-weld connected to said cam.

6. The eccentric drive of claim 1, wherein said holder is circularly shaped.

7. The eccentric drive of claim 6, wherein said holder has an annular shape.

8. The eccentric drive of claim 1, wherein said holder is made of spring steel.

9. The eccentric drive of claim 1, wherein said cam and said wheel are formed as a single piece.

10. The eccentric drive of claim 1, wherein said drive motor has a drive shaft with a pinion mounted thereon so that said pinion cannot rotate relative to said shaft; and, said wheel is a toothed wheel in meshing engagement with said pinion.

11. The eccentric drive of claim 10, wherein said connecting rod is in gliding contact engagement with an end face of said toothed wheel.

12. The eccentric drive of claim 1, wherein said work apparatus is a hedge trimmer.

* * * * *